March 3, 1931.  W. H. FOSTER  1,795,018
HYDRAULIC SPEED CONTROL FOR LATHES
Filed March 18, 1929  6 Sheets-Sheet 1

Inventor:
William H. Foster.

March 3, 1931. W. H. FOSTER 1,795,018
HYDRAULIC SPEED CONTROL FOR LATHES
Filed March 18, 1929   6 Sheets-Sheet 2

Inventor
William H. Foster

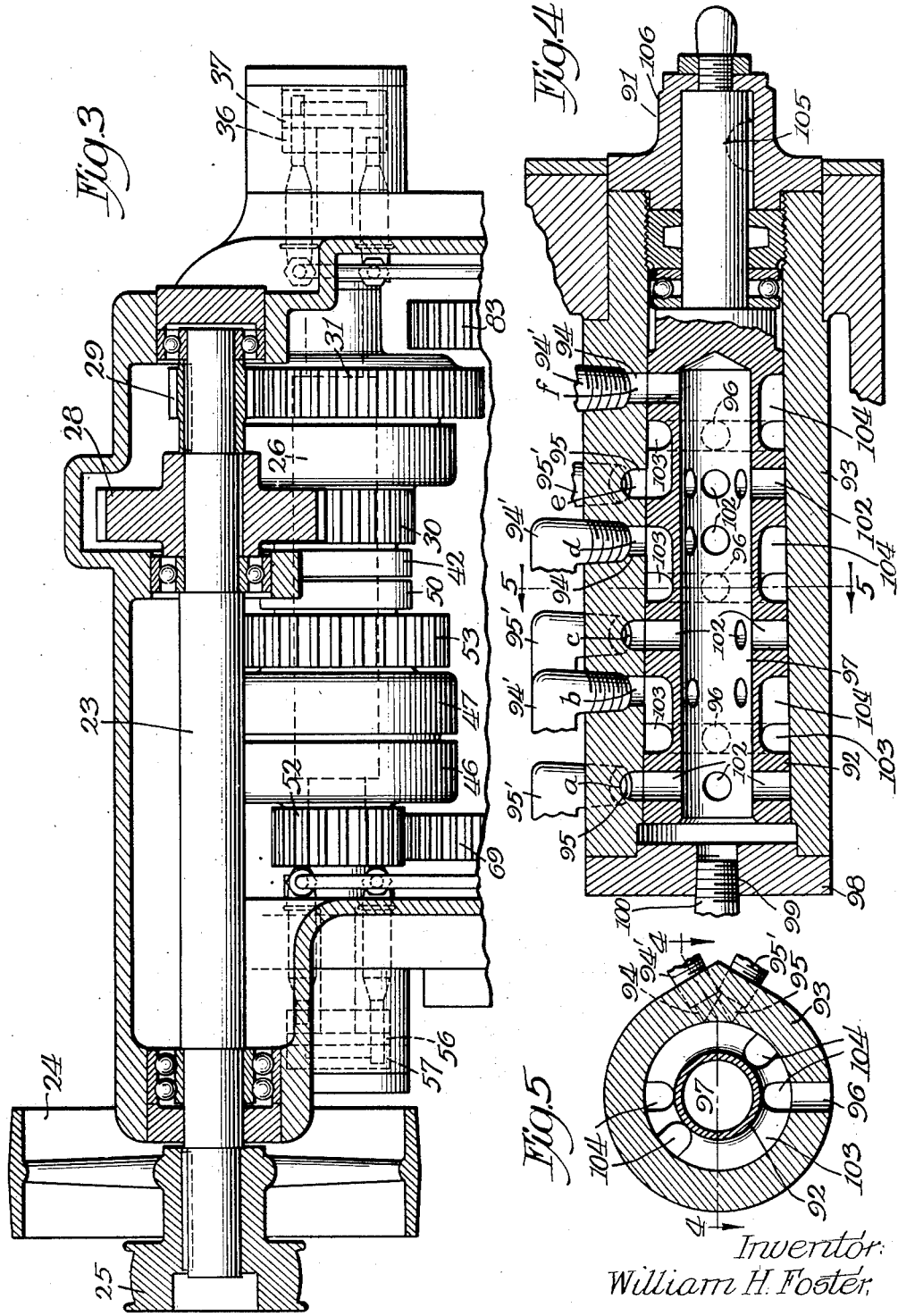

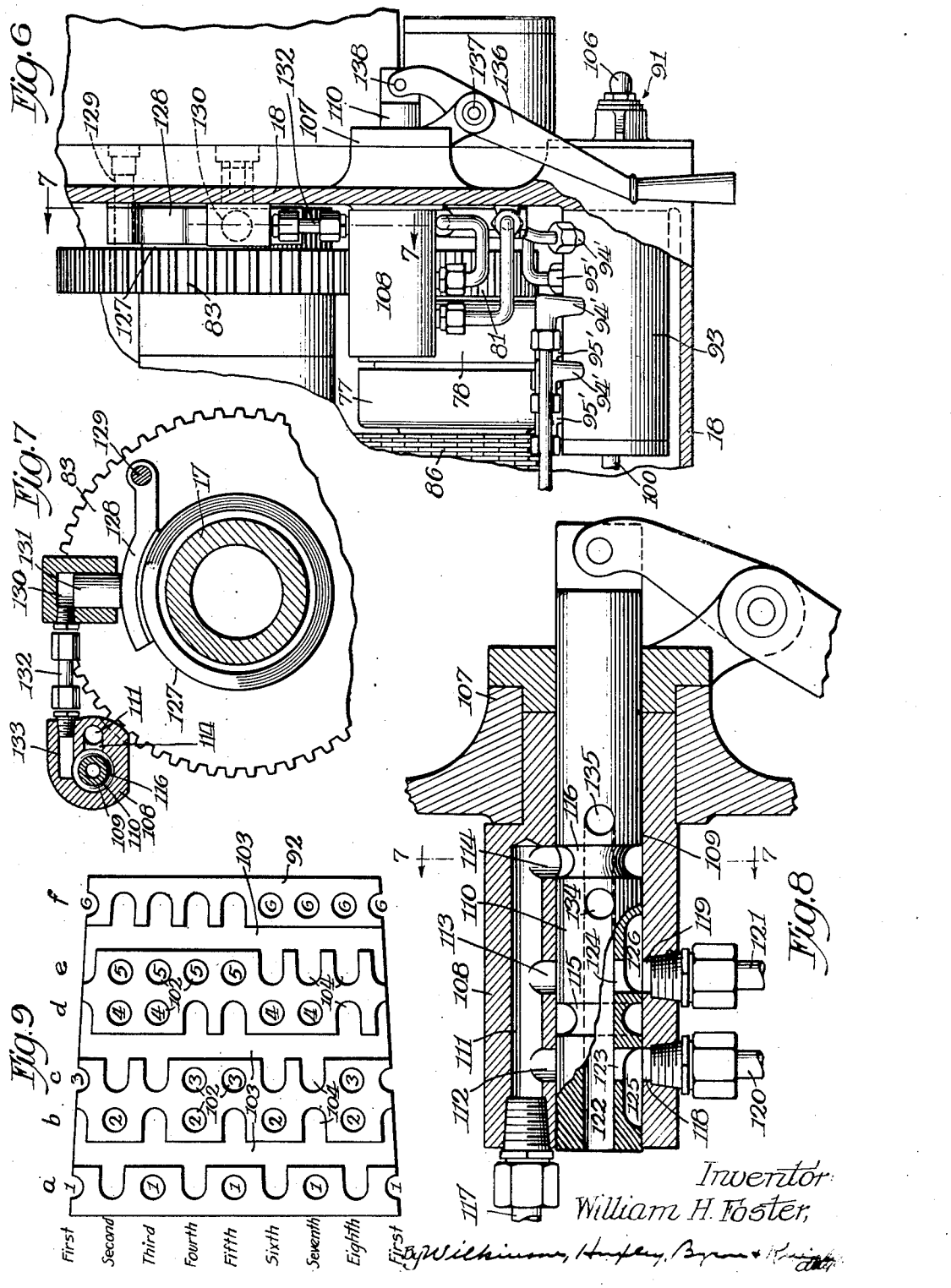

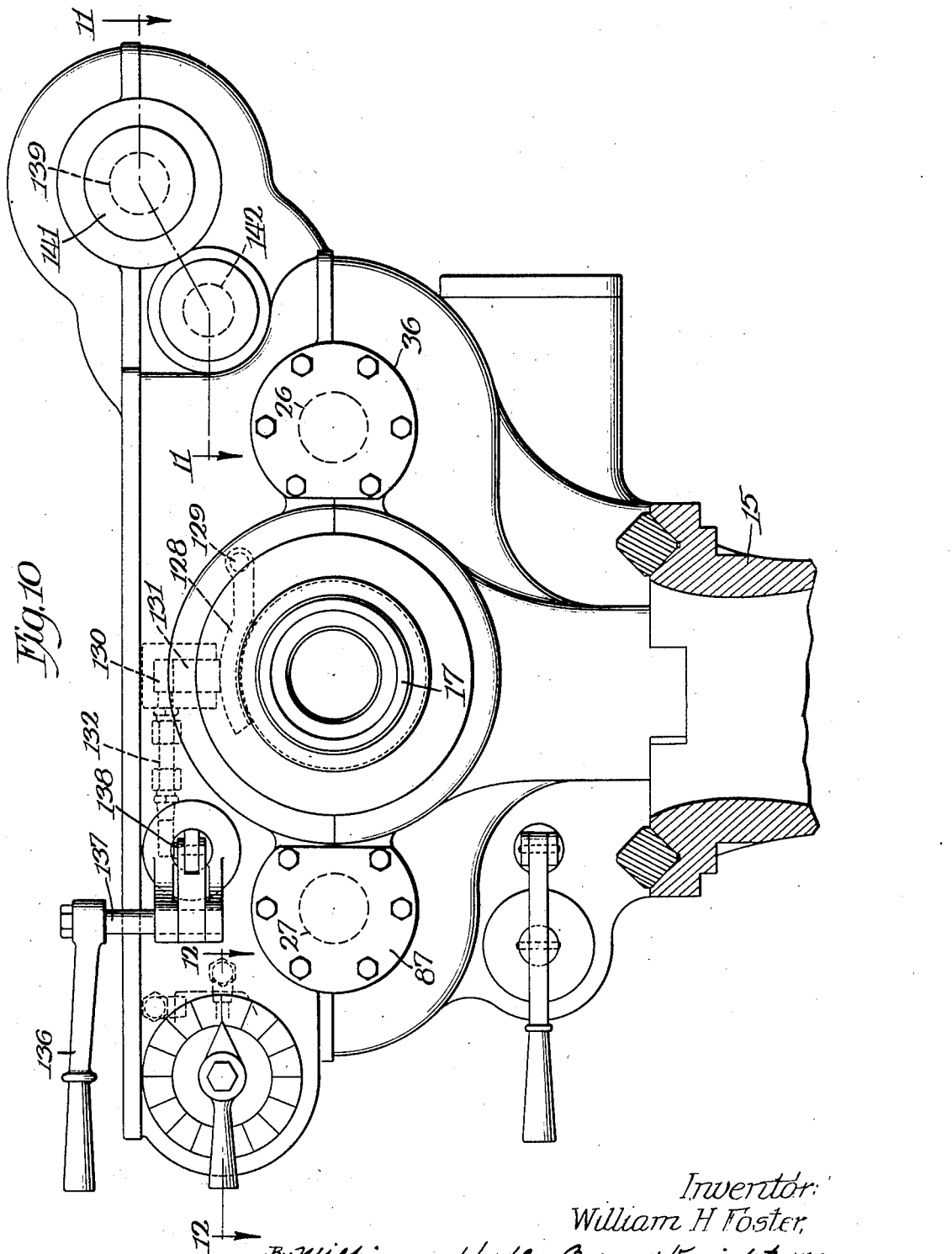

March 3, 1931.    W. H. FOSTER    1,795,018
HYDRAULIC SPEED CONTROL FOR LATHES
Filed March 18, 1929    6 Sheets-Sheet 6
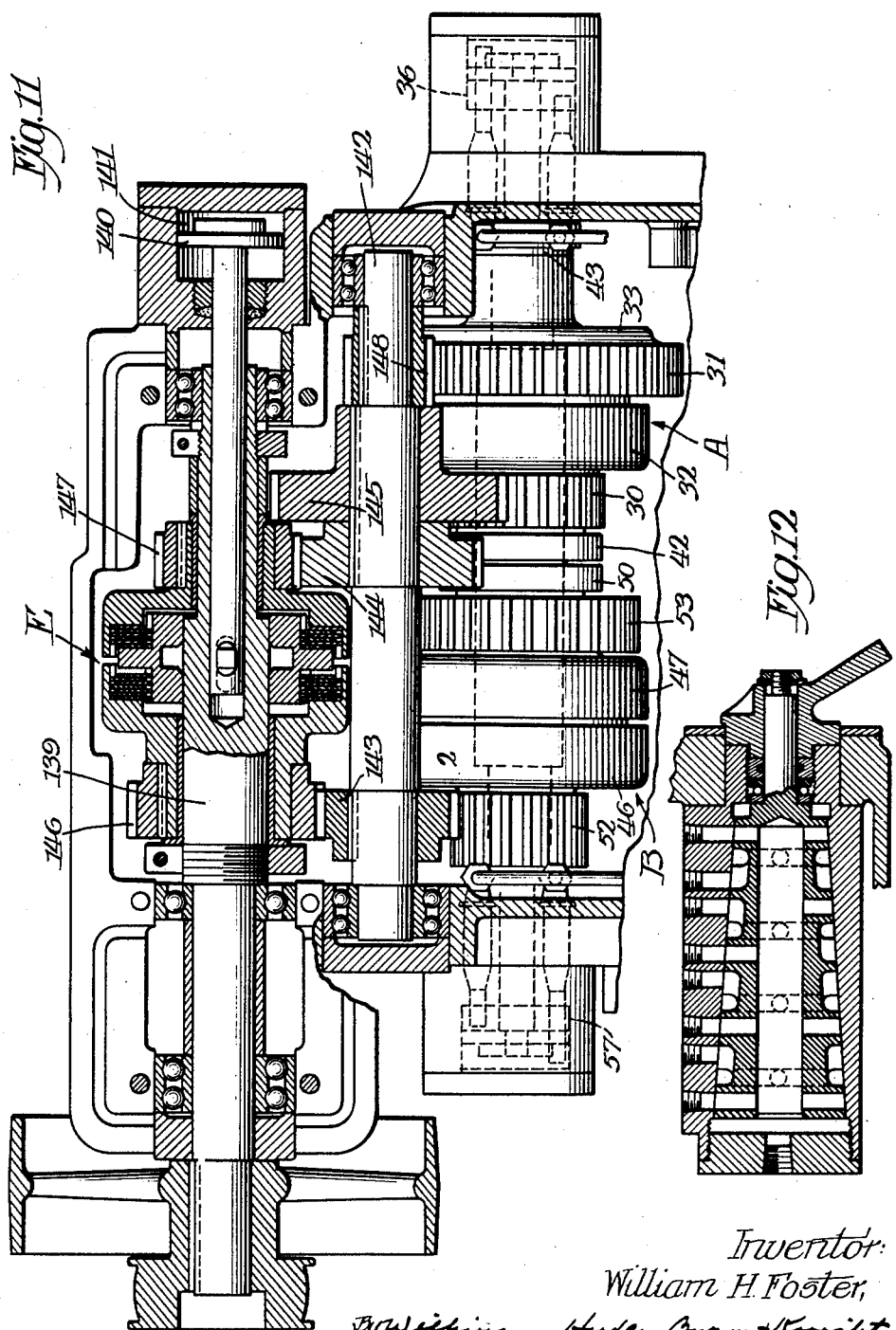
Inventor:
William H. Foster, Patented Mar. 3, 1931

1,795,018

UNITED STATES PATENT OFFICE

WILLIAM H. FOSTER, OF ELKHART, INDIANA, ASSIGNOR TO FOSTER MACHINE COMPANY, OF ELKHART, INDIANA, A CORPORATION OF INDIANA

HYDRAULIC SPEED CONTROL FOR LATHES

Application filed March 18, 1929. Serial No. 347,814.

This invention relates to hydraulic or fluid-pressure means for controlling the speed of rotation of a lathe spindle and while particularly adapted to use in connection with lathes, it may also be found to be useful in other machines having a rotatably driven part, the speed of rotation of which is desirably varied from time to time.

The principle object of the invention is to provide means for controlling the speed of rotation of a part such as a lathe spindle, which controlling means is especially simple in character and may be manipulated by the operator of the machine with the greatest of facility so that his attention to the work need not be materially distracted.

Other objects of the invention are to provide hydraulic or fluid-pressure actuated means for controlling the speed of the spindle; to provide such fluid-pressure control means which may be controlled through the agency of a single valve which of itself may be quickly and easily adjusted to effect the desired spindle speed adjustment; to provide mechanism whereby the spindle may be selectively driven at any one of a plurality of speeds in either forward or reverse direction; to provide conveniently controlled means for effecting forward or reverse rotation of the spindle and also for stopping the spindle; to provide speed control mechanism which is adaptable to any desired number of speed changes and in general, it is the object of the invention to provide improved control means for controlling the operation of the spindle of a lathe.

Further objects and advantages of my invention will be understood by reference to the following specification and accompanying six sheets of drawings wherein I have illustrated a part of a lathe including the spindle and mechanism for driving the spindle selectively at any one of a plurality of speeds in either forward or reverse direction.

In the drawings:

Fig. 1 is an end view of the front end of a lathe head, that is, looking at the work end of the lathe spindle.

Figs. 2, 3, and 4 are sections on the lines 2—2, 3—3, and 4—4, respectively, of Fig. 1.

Fig. 5 is a section on the line 5—5 of Fig. 4.

Fig. 6 is a plan, certain parts being broken away, of a part of the mechanism shown in Fig. 1, the general location of such parts being indicated by the line 6—6 in Fig. 1.

Fig. 7 is a section on the line 7—7 of Fig. 6.

Fig. 8 is a section on the line 8—8 of Fig. 1.

Fig. 9 is a development of a valve core which appears in Figs. 4 and 5.

Figure 1:
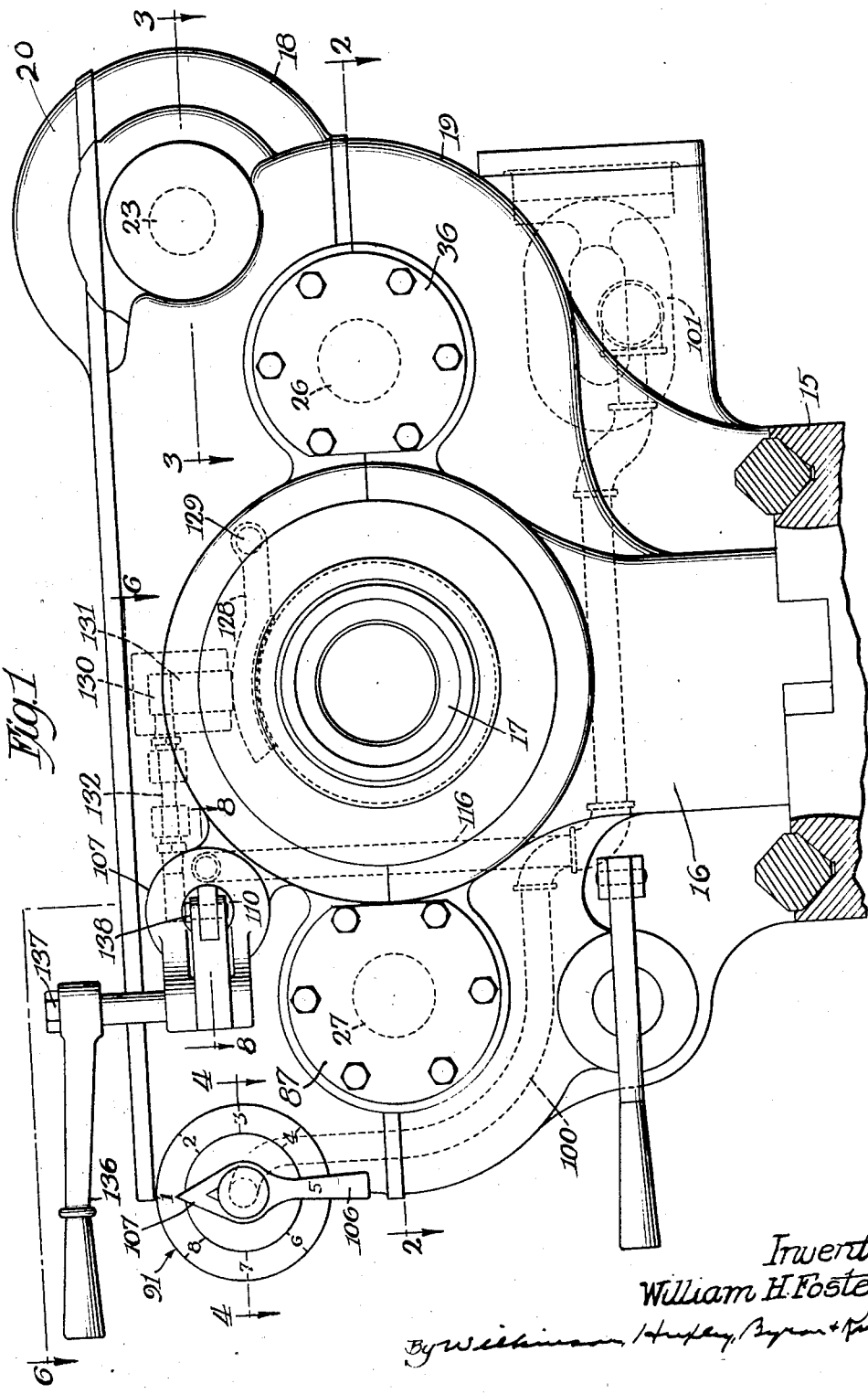

Figs. 10, 11 and 12, illustrate modifications of the structure shown in Figs. 1 to 9, inclusive, whereby the speed range of the spindle is increased, or decreased Fig. 10 being an end view similar to Fig. 1, and Figs. 11 and 12 being sections on the lines 11—11 and 12—12 respectively, of Fig. 10.

Referring now to the drawings, I have shown a part of a lathe which includes a lathe bed 15 on which is mounted at one end, the spindle head 16 which includes a spindle 17, which, in the present instance, consists of a hollow or tubular shaft-like member through which stock may be advanced into position wherein the usual cutting or other tools may perform their usual functions on the said stock.

The head 16 includes mechanism, which I will presently describe, mounted in a casing which in this instance consists of an upper part 18 and a lower part 19, the two being secured together by means of bolts, or in any other suitable manner well-known in the art and hence not shown in the drawings. The upper casing part 18 may be provided with a cover plate 20 which may be made integral therewith but preferably is made a separate part and removably secured to the said upper casing part 18. The head casing as a whole is of such construction it will hold a quantity of lubricating oil which serves to lubricate the mechanism, and supply oil for operating a pump which in turn operates the clutches, the arrangement being such that some of the parts of the said mechanism are partly immersed in the oil which is normally in the bottom of the casing, the said immersed parts serving to throw up sufficient lubricant to maintain other parts of the mechanism well lubricated at all times.

The spindle 17 is rotatably mounted in the casing by means of roller bearings 21—21 mounted in the opposite ends of the casing parts 18 and 19 which are so constructed as to provide bearing housings 22—22. The spindle 17 is driven or rotated from a main drive shaft 23 which is rotatably mounted in the head casing in any suitable manner such as shown in Fig. 3, and provided with a pulley 24 whereby the main drive shaft may be rotated through the agency of a belt which extends around a pulley carried by an electric motor or around a pulley carried by a line power shaft. A smaller pulley 25 may be provided on the main drive shaft 23 for facilitating belt driving of another part of the lathe mechanism or some other mechanism, or the said smaller pulley 25 may be used for driving the main drive shaft 23 at a different rate of speed than is conveniently obtainable by use of the large pulley 24.

A plurality of driving connections between the main drive shaft 23 and spindle 17 are provided and include counter shafts 26 and 27 which support certain mechanism I am about to describe.

The main drive shaft 23 is provided with gears 28 and 29 which are keyed thereto so as to rotate therewith, the said gears being of different pitch diameters. On the counter shaft 26, I provide gears 30 and 31 which are formed integral with or mounted on clutch parts 32 and 33 respectively, and mesh with the main drive shaft gears 28 and 29 respectively. The clutch parts 32 and 33 are each rotatably mounted on the shaft 26, suitable bearing bushings being provided if desired, and an intermediate clutch part 34 which is splined or otherwise non-rotatably mounted on the shaft 26 is provided for selectively clutching the clutch parts 32 and 33 to the counter shaft 26. It will be understood that although the clutch 34 is non-rotatably mounted on the counter shaft 26, it may be moved axially thereof so as to effect the said clutching operation, suitable friction discs, indicated at 35, being provided in accordance with well known practice in the clutching art, for effecting the desired non-slipping frictional engagement between the shaft clutch part 34 and loose clutch parts 32 and 33. Tooth clutches or other devices may also be used.

According to my present invention, I provide hydraulic or fluid-pressure actuated means for controlling the fast clutch part 34 so as to clutch either of the loose clutch parts 32 and 33 to the counter shaft 26. In the present instance, this fluid-pressure control mechanism includes a cylinder 36 in which a piston 37 carried by a piston rod 38 is adapted to be moved axially of the cylinder by means of fluid-pressure. The piston rod 38 is axially slidably mounted in the counter shaft 26, coaxial therewith, the shaft 26 being drilled out as indicated at 39 for this purpose. Adjacent its inner end, the piston rod 38 is provided with a cross pin 40 which extends diametrically through the shaft 26, an elongated slot 41 being provided in the shaft for permitting the pin 40 to move axially of the shaft in order that the clutch part 34 may be moved from one position to another to clutch the clutch parts 32 and 33 to the counter shaft 26.

Axial movement of the clutch parts 32 and 33 along the shaft 26 when subjected to the pressure of the clutch part 34, is prevented by means of collars 42 and 43 which are threadedly mounted on the shaft adjacent the outer ends of the hubs of the said clutch parts 32 and 33. The collars 42 and 43 are preferably split and clamped in place by means of clamping bolts, as indicated at 44 and 45, in a well-known manner.

It will be apparent to those skilled in the art that the above described mechanism is such that the counter shaft 26 may be rotated selectively at either one of two speeds because of the difference in the ratios of the pitch diameters between the meshing gears 28 and 30, and 29 and 31. The clutch mechanism 32, 33 and 34 and its associated gearing, therefore, constitutes a driving unit which is selectively engageable to drive the counter shaft 26 at either one of two speeds. For convenience in further reference, this unit may be designated A.

Figure 2:
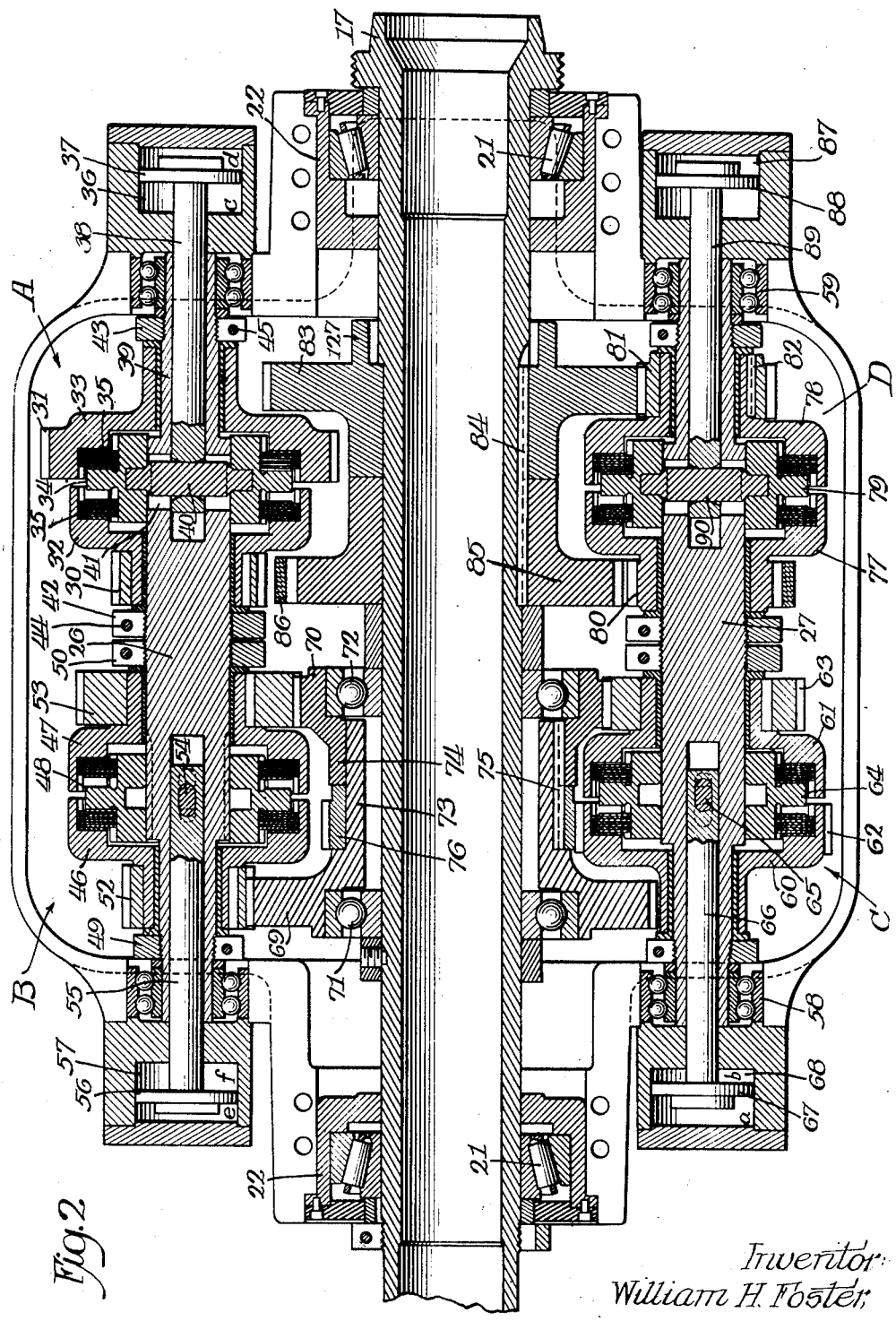

A second driving unit indicated generally at B, similar to the above described unit is associated with the counter shaft 26, being located at the left hand end of the said shaft as shown in Fig. 2. This second unit includes clutch parts 46 and 47 which are rotatably mounted on the shaft 26 and an intermediate clutch part 48 which is non-rotatably but axially mounted on the counter shaft so that it may be moved into position for operatively connecting either of the clutch parts 46 and 47 to the counter shaft 26. The clutch parts 46 and 47 are held against axial movement under the influence of the pressure of the clutch part 48, by means of collars 49 and 50 which are secured to the counter shaft in the manner in which the collars 42 and 43 are secured. The clutch parts 46 and 47 are respectively provided with gear members 52 and 53 which are keyed to outwardly projecting hub portions of the respective clutch parts so as to rotate therewith. The intermediate clutch part 48 is controlled through the agency of a cross pin 54 carried by a piston rod 55 and a piston 56 secured to said piston rod and adapted to be moved axially in a cylinder 57 by means of hydraulic or fluid-pressure. It will be noted that clutch parts 46 and 47 and the respective gears carried thereby may each be rotated at the two speeds of the counter shaft 26.

The second counter shaft 27 is rotatably mounted in the housing 16 by means of ball bearings 58 and 59 in substantially the same manner in which the shaft 26 is rotatably mounted, as shown in Fig. 2.

A third driving unit C similar to the first and second units above described, is mounted on the counter shaft 27 and is operatively connected with the second unit on the counter shaft 26 above described. This third unit includes clutch members 60 and 61 which carry gears 62 and 63 respectively, the said gears being formed integral with the respective clutch members or secured thereto so as to rotate therewith. The clutch parts 60 and 61 are rotatably mounted on the counter shaft 27 and an intermediate clutch part 64 is non-rotatably but axially slidably mounted on the counter shaft 27 so as to be operative to effect clutching engagement between either of the clutch parts 60 or 61 and the counter shaft 27. The clutch part 64 may be controlled through the agency of a cross pin 65 carried by a piston rod 66 having a piston 67 disposed in a cylinder 68 and adapted to be axially moved in the cylinder by means of hydraulic or fluid-pressure.

Driving units B and C are connected by gearing so that the unit B is operative to effect rotation of the clutch parts of unit C. The means for so connecting units B and C consists of gear members 69 and 70 which are rotatably mounted on the lathe spindle 17 through the agency of ball bearings 71 and 72. In the present instance, the gear 69 is provided with elongated sleeve or hub part 73 on which the gear 70 is mounted by means of a hub 74, the gear 70 being keyed to the gear 69 by means of a key 75 so that gears 69 and 70 are rotatable as a unit about the spindle 17. The gear 69 meshes with the gear 52 of driving unit B and gear 70 meshes with gear 53 of the said driving unit B. It will now be seen that the gear unit 69, 70, 73, may be rotated at any one of four speeds since it is operatively connected to each of the gears 52 and 53 of the driving unit B which gears are each rotatable at two different speeds.

The gear 70, in addition to meshing with the gear 53 of driving unit B, meshes with gear 63 of driving unit C. Hence, the gear 63 and clutch part 61 are rotatable selectively at any one of the four speeds at which the gear unit 69, 70, 73 is rotatable. The clutch part 60 and gear 62 are operatively connected to the gear unit 69, 70, 73 through the agency of a gear 76 which is mounted on the hub 73 and keyed thereto by the key 75. Hence, the hub 60 and gear 62 are also rotatable selectively at any one of four different speeds. It will be apparent from an inspection of the drawings that the various gear ratios are such that the clutch parts 60 and 61 of driving unit C are each rotatable at four different speeds and that the four speeds of each of the said clutch parts are different from the four speeds of the other clutch part. Hence, the counter shaft 27 may be rotated selectively at any one of eight speeds.

The counter shaft 27 and lathe spindle 17 are operatively connected so that the spindle may be driven either forward or reverse at any one of eight different speds. The means for so connecting the counter shaft and spindle 17 consists of a fourth unit D similar in construction to the units A, B and C. This unit D consists of clutch parts 77 and 78 which are rotatably mounted on the counter shaft 27 and an intermediate clutch part 79 which is axially slidable but non-rotatably mounted on the said counter shaft 27. In the present instance, the clutch part 77 is provided with a sprocket 80 formed integral on the hub of the clutch part 77 and the clutch part 78 is provided with a gear 81 which, in the present instance, is formed independently of the said clutch part and non-rotatably mounted on the hub of the said clutch part, a key 82 being provided to lock the parts against relative rotation. A gear 83 is non-rotatably mounted on the spindle 17 by means of a key 84 and meshes with the gear 81 carried by the clutch part 78. It will be apparent that by clutching the clutch part 78 to the shaft 27, the spindle 17 may be rotated in one, say the forward direction, at any one of eight speeds. A sprocket 85 is also mounted on the spindle 17 and held against rotation thereon by means of the said key 84 and a chain 86 connects the sprocket 85 with the sprocket 80 so that when the clutch part 77 of the driving unit D is clutched to the counter shaft 27, the spindle may be rotated in the reverse direction at any one of eight speeds.

The clutch part 79 of the unit D may be controlled by fluid or hydraulic pressure in a manner similar to that in which the corresponding clutch elements of driving units A, B and C are controlled. Accordingly, I provide a cylinder 87 in which a piston 88 is adapted to be actuated by means of fluid-pressure, and a piston rod 89 connected to the said piston and provided at its inner end with a cross pin 90 which is interlocked with the said clutch part 79.

For controlling the fluid-pressure in the pistons 36, 57 and 68, which control driving units A, B and C, I provide a single valve means which is so arranged that eight positions are provided. Each position of the valve causes a predetermined adjustment or setting of the clutch parts of the driving units A, B and C by controlling the admission and discharge of fluid-pressure in the said cylinders 36, 57 and 68. The said valve is indicated generally at 91 in Figs. 1 and 4 and includes a core 92 which is rotatably mounted in a casing 93, the latter being mounted in the upper housing part 18 in any suitable manner. The casing 93 of the valve is provided with a plurality of apertures 94 and 95 and a plurality of discharge apertures 96. The core part 92 is bored out as shown at 97 and the end wall 98 of the valve housing is tapped as shown at 99 to receive a pipe line connection 100 which connects with an oil pump 101 of any suitable type which is mounted on the inside of the head casing or housing so as to be capable of supplying oil under pressure from the supply of lubricant contained in the said head 16. The pump 101 may be of a gear type, well-known in the art, and may be driven by any suitable gear or chain driving connection with the counter shaft 26 or any other rotating part of the mechanism. Such connection, being well within the skill of a mechanic versed in this art, is omitted in the drawings to facilitate clearness of illustration.

The apertures or ports 94 and 95 in the valve housing 93 are tapped to receive pipe line fittings 94' and 95' respectively, and the said ports are arranged to alternately extend upwardly and downwardly as clearly shown in Figs. 4, 5 and 6, so as to facilitate positioning of the various pipe lines and also so as to provide room to permit the respective fittings to be screwed into place without being obstructed by the adjacent fittings. Thus, compactness of the valve structure is also made possible. Each of the ports 94 and 95 in the valve housing 93 constitute both inlet and outlet ports for the respective ends of the cylinders to which they are connected.

In Fig. 4, the ports 94 and 95, six in number, are also designated $a$, $b$, $c$, $d$, $e$ and $f$ for greater convenience in referring thereto and for facilitating description of the connections from the cylinders 36, 57 and 68 with the said valve ports. In Fig. 2, I have indicated the opposite ends of the cylinders by the reference letters $a$, $b$, $c$, $d$, $e$ and $f$ according to the similarly designated valve ports to which the respective ends of the cylinders are connected. In other words, the port $a$ in the valve is connected by a suitable pipe line to the outer end $a$ of the cylinder 68, the port $b$ to the inner end of the cylinder 68 etc. etc.

By an inspection of Figs. 2 and 4, it will be seen that the valve in the position shown causes fluid pressure to be supplied to the outer portion of the cylinder 68, and the inner portions of the cylinders 36 and 57 so that the respective clutch parts assume the positions shown in Fig. 2. For establishing communication between the drilled out chamber 97 in the valve core and the ports $a$ to $f$ inclusive, the said core is provided with passageways 102—102 extending from the chamber 97 to the outside of the core and adapted to communicate with the ports 94 and 95. The core is also provided with a plurality of annular grooves 103 which extend therearound but which do not communicate with the chamber 97. A plurality of recesses 104 in the outer surface of the core communicate with and extend laterally from the said grooves 103 so as to be capable of effecting communication between the ports 94 and 95 and the said grooves. The discharge openings 96 in the valve housing 93 are aligned with the grooves 103 so that any existing pressure in the ends of the cylinders with which the grooves communicate (through the recesses 104 and valve ports), is relieved through the said discharge openings 96. It will be seen by an inspection of Fig. 5 that the ports designated $b$, $d$, and $e$ are in communication with the respective discharge openings 96 so that the fluid-pressure in the cylinder portions, $b$, $d$ and $e$ is thereby relieved. It will now be apparent that the valve structure is such that when pressure is supplied to one end of a cylinder, the existing pressure in the other end is simultaneously relieved.

The valve core 92 is provided with an extension 105 to which an operating handle 106 may be secured in any suitable manner, as indicated in Figs. 1 and 6. The operating handle 106 is provided with a pointer 107 which indicates, by pointing to suitable indicia, the position of adjustment or speed for which the spindle operating mechanism is set.

In Fig. 9, I have shown a development of the valve core 92 and the following tabulation will serve to indicate the eight positions of adjustment for the core and the connections established in each position. In the following tabulation "on" is used to indicate that fluid-pressure is supplied through the respective ports indicated and to the corresponding cylinder end ports. "Off" is used to indicate that the pressure is relieved.

| Core | Ports | | | | | |
|---|---|---|---|---|---|---|
| | a | b | c | d | e | f |
| First position | On | Off | On | Off | Off | On |
| Second position | Off | On | Off | On | On | Off |
| Third position | On | Off | Off | On | On | Off |
| Fourth position | Off | On | On | Off | Off | On |
| Fifth position | On | Off | On | Off | On | Off |
| Sixth position | Off | On | Off | On | Off | On |
| Seventh position | On | Off | Off | On | Off | On |
| Eighth position | Off | On | On | Off | Off | On |

The valve 91 controls the driving units A, B and C and a separate valve is provided for controlling the forward and reverse driving unit D. The valve for controlling the unit D is indicated at 107 and comprises a valve body or housing 108 which is drilled out as at 109 to slidably receive a valve core 110. The valve body 108 is also drilled out to provide a passageway 111, substantially parallel with the core receiving bore 109 and passageways 112, 113 and 114 are provided whereby fluid under pressure supplied to the passageway 111 may communicate with the annular grooves 115 and 116 provided in the valve core. Fluid under pressure is supplied to the passageway 111 by means of a pipe connection 117 from the pump 101. The valve body 108 is also provided with openings 118 and 119 which are tapped to receive pipe line connections 120 and 121 which are respectively connected to the opposite end portions of the cylinder 87. The valve core is centrally cored out as indicated at 112 and provided with apertures 123 and 124 for establishing communication between the pipe lines 120 and 121 and the chamber 122. The valve core 110 is also provided with recesses 125 and 126 which communicate with the openings 123 and 124 respectively and extend lengthwise of the valve core from the respective openings.

As shown in Fig. 8, the valve is in a neutral position of adjustment in which fluid pressure is not supplied to either end portion of the cylinder 87. It will be understood that if the valve is adjusted so that fluid under pressure may pass from the passageway 111 through the opening 112, around the annular groove 115 and through the opening 118 into the pipe line 120 and into the corresponding end of the cylinder 87, the piston 88 will be caused to move accordingly and thereby effect operative connection between the counter shaft 27 and one of the clutch parts of the unit D. When the valve is so adjusted, it will be seen that the pressure in the opposite end of the cylinder will be relieved through the pipe line 121, the recess 126, opening 124 and the cylinder chamber 122 which is open at the inner end of the valve core so that the fluid may flow from this chamber back into the supply of lubricant contained in the lathe head casing. The valve may also be adjusted so as to effect communication between the passageway 111 and the pipe line 121 so as to supply fluid-pressure to the other end of the cylinder 87 in which case the pressure is relieved from the opposite end of the cylinder through the pipe line 120, the recess 125, aperture 123 and chamber 122.

In addition to controlling the driving unit D, the valve 107 controls brake mechanism best shown in Figs. 1, 6 and 7. The brake mechanism comprises a brake drum 127 preferably formed as an integral part of the gear 83, and a brake lever 128 pivotally mounted by means of a stud 129 carried by the head casing. The brake lever 128 may be provided with a suitable friction brake lining which bears on the brake drum 127 to stop rotation of the same. For forcing the brake lever 128 into braking engagement with the brake drum 127, I provide a cylinder 130 in which a plunger 131 is slidably mounted and adapted to be forced outwardly by means of fluid-pressure supplied by the pump 101 and controlled by the said valve 107. The cylinder member 130 is attached to the end wall of the head casing 18 in any suitable manner and the cylinder chamber is connected by means of a pipe line 132 to a passageway 133 in the upper part of the valve body or housing 108 (see Fig. 7). As shown in Fig. 7, the passageway 133 communicates with the annular groove 116 provided in the valve core, which groove is in communication with the passageway 111 through the aperture 114. Hence, fluid under pressure will flow from the passageway 111, through the annular groove 116 and passageway 133 into the cylinder chamber 130 to force the plunger 131 downwardly, thereby to effect frictional engagement between the brake lever 128 and brake drum 127. When the valve 107 is in position to effect a neutral position of the clutch member 79 of the driving unit D, (as shown in Fig. 8) the brake 128 is applied to hold the spindle against rotation. When the valve is adjusted to effect operative engagement between one of the clutch parts of the driving unit D and the counter shaft 27, pressure in the brake cylinder chamber 130 is relieved. For relieving the pressure in the brake cylinder chamber, the valve core 110 is provided with openings 134 and 135 which are adapted to register with the inner end of the passageway 133 so that the fluid in the cylinder chamber 130 may flow backwards from the chamber through the passageway 133 and one of the openings 134 and 135, into the chamber 122 and thence to the supply of lubricant.

It will be seen that the arrangement of the valve 107 is such that when the driving unit D is in neutral position, the brake is applied to hold the spindle against rotation. It will also be seen that in changing the direction of rotation of the spindle, the spindle is effectively stopped from rotating before the reverse driving connection can be completed. Such automatic braking of the spindle is desirable in that it avoids over straining of the driving parts which might otherwise occur in changing the direction of rotation of the spindle 17. A hand lever 136 pivoted as indicated at 137 and connected at its inner end as shown at 138 to the outer end of the valve core 110 is provided for facilitating manual adjustment of the valve 107.

The above described mechanism whereby eight distinct speeds are obtained for the spindle, is susceptible of adaptation by the addition of further driving units such as A, B and C, to provide other ranges of speeds. For instance, in Figs. 10 to 12 inclusive, I have shown an arrangement, generally similar to the arrangement shown in Figs. 1 to 9 inclusive, but in which sixteen speeds are provided. In this modification a selectively engagable driving unit E is mounted on the main drive shaft indicated by the reference character 139 and controlled through the agency of a piston 140 working in a cylinder 141. The driving unit E and its fluid-pressure control mechanism is substantially the same as the mechanism of the units A, B, C and D and hence need not be further described in detail. In this modification, an extra counter shaft 142 is provided and carries gears 143, 144 and 145 for transmitting rotation from the main drive shaft 139 to the counter shaft 26. The gears 143 and 144 respectively mesh with gears 146 and 147 which are carried by the clutch parts of the unit E and the gear 145 meshes with the gear 30 on the counter shaft 26. Another gear 148 also carried by the extra counter shaft 142 meshes with the gear 31 on the counter shaft 26.

By an inspection of Fig. 11 it will be seen that each of the clutch parts 32 and 33 of driving unit A are rotatable selectively at either one or two speeds and that the clutch parts 46 and 47 of driving unit B are each rotatable at any one of four speeds. Hence, the range of speeds of parts of the driving units A and B is double the range of speeds of the same units in the arrangement shown in Figs. 1 to 9 inclusive. Accordingly, the gear unit 69, 70 and 73 would be rotatable selectively at any one of eight speeds and the clutch parts 60 and 61 of driving unit C would each be selectively at any one of eight speeds so that the counter shaft 27 may be rotated at any one of sixteen speeds.

In Fig. 12 I have shown a sectional view of the valve for controlling four driving units instead of three. The construction of the valve as shown in Fig. 12 is similar to that of the valve shown in Fig. 4 but is extended to provide control for the additional driving unit E. Those skilled in this art will readily understand the manner in which the valve is arranged, particularly in view of the complete description of the valve provided for the eight speed arrangement, and hence it is not deemed necessary to supply a detailed description or illustration of the modified or extended valve mechanism.

Obviously, the range of speeds may be greatly increased but, generally speaking, a range of eight speeds is sufficient for most practical purposes and it is comparatively seldom that as many as sixteen speeds are required. In view of the fact that more than sixteen speeds are seldom required, and in view of the fact that a person skilled in the art, after the present disclosure, can readily produce an arrangement according to my invention for affording a greater speed range, I do not deem it necessary to illustrate nor describe an arrangement for affording such a further increased speed range.

In the above specification I have referred to hydraulic pressure or fluid pressure in a broad sense and without intending to limit myself to the use of any particular fluid under pressure. As above brought out, I have found it convenient in the present instance to use a part of the lubricating oil which is contained in the housing for controlling the speed changing mechanism. By this means I avoid the necessity of providing additional containers and mechanism for supplying fluid under pressure. Also for simplification of description of the mechanism, I have omitted reference to numerous details of construction which are well-known in the art and obviously within the knowledge of any mechanic skilled in this art.

I am aware that changes may be made in the form, proportion and arrangement of parts without departing from the spirit of my invention, the scope of which should be determined by reference to the following claims, the same being construed as broadly as possible consistent with the state of the art.

I claim as my invention:

1. In a lathe of the class described, the combination of a spindle, a rotatably mounted counter shaft, means for selectively effecting rotation of said counter shaft at either one of two speeds, a pair of clutch members rotatably mounted on said counter shaft, a pair of gear members of different pitch diameters respectively connected to said clutch members so as to be rotatable therewith, means for selectively clutching said clutch members and their associated gear members to said counter shaft, each of said gear members being thereby rotatable selectively at either one of two speeds, a second counter shaft, a pair of clutch members rotatably mounted on said second counter shaft, a driving connection between each of said last mentioned clutch members and said gear members whereby said last mentioned clutch members are each rotatable at four speeds, means for selectively clutching said last mentioned clutch members to said second counter shaft whereby the latter is selectively rotatable at any one of eight speeds, and a driving connection between said second counter shaft and said spindle whereby the latter is adapted to be selectively driven at any one of the said eight speeds.

2. In a lathe of the class described, the combination of a spindle, a rotatably mounted counter shaft, fluid-pressure controlled means for selectively effecting rotation of said counter shaft at either one of two speeds, a pair of clutch members rotatably mounted on said counter shaft, a pair of gear members of different pitch diameters respectively connected to said clutch members so as to be rotatable therewith, fluid-pressure controlled means for selectively clutching said clutch members and their associated gear members to said counter shaft, each of said gear members being thereby rotatable selectively at either one of two speeds, a second counter shaft, a pair of clutch members rotatably mounted on said second counter shaft, a driving connection between each of said last mentioned clutch members and said gear members whereby said last mentioned clutch members are each rotatable at four speeds, fluid-pressure controlled means for selectively clutching said last mentioned clutch members to said second counter shaft whereby the latter is selectively rotatable at any one of eight speeds, a driving connection between said second counter shaft and said spindle whereby the latter is adapted to be selectively driven at any one of said eight speeds.

3. In a lathe of the class described, the combination of a spindle, a rotatably mounted counter shaft, fluid-pressure controlled means for selectively effecting rotation of said counter shaft at either one of two speeds, a pair of clutch members rotatably mounted on said counter shaft, a pair of gear members of different pitch diameters respectively connected to said clutch members so as to be rotatable therewith, fluid-pressure controlled means for selectively clutching said clutch members and their associated gear members to said counter shaft, each of said gear members being thereby rotatable selectively at either one of two speeds, a second counter shaft, a pair of clutch members rotatably mounted on said second counter shaft, fluid-pressure controlled means for selectively clutching said last mentioned clutch members to said second counter shaft, gear members of different pitch diameters respectively associated with each of said last mentioned clutch members, and a driving connection between each of the gear members on said first mentioned counter shaft and each of the gear members on said second counter shaft, said driving connection comprising a rotatably mounted sleeve, gear driving connections between said gear members on said first mentioned counter shaft and said sleeve, whereby said sleeve is selectively rotatable at any one of four speeds, gear connections between said sleeve and each of the gear members on said second counter shaft whereby each of said last mentioned gear members is rotatable selectively at any one of four speeds and whereby said second counter shaft is selectively rotatable at any one of eight speeds, and a driving connection between said second counter shaft and spindle.

4. In a lathe of the class described, the combination of a spindle, a rotatably mounted counter shaft, fluid-pressure controlled means for selectively effecting rotation of said counter shaft at either one of two speeds, a pair of clutch members rotatably mounted on said counter shaft, a pair of gear members of different pitch diameters respectively connected to said clutch members so as to be rotatable therewith, fluid-pressure controlled means for selectively clutching said clutch members and their associated gear members to said counter shaft, each of said gear members being thereby rotatable selectively at either one of two speeds, a second counter shaft, a pair of clutch members rotatably mounted on said second counter shaft, fluid-pressure controlled means for selectively clutching said last mentioned clutch members to said second counter shaft, gear members of different pitch diameters respectively associated with each of said last mentioned clutch members, and a driving connection between each of the gear members on said first mentioned counter shaft and each of the gear members on said second counter shaft, said driving connection comprising a rotatably mounted sleeve, gear driving connections between said gear members on said first mentioned counter shaft and said sleeve, whereby said sleeve is selectively rotatable at any one of four speeds, gear connections between said sleeve and each of the gear members on said second counter shaft whereby each of said last mentioned gear members is rotatable selectively at any one of four speeds and whereby said second counter shaft is selectively rotatable at any one of eight speeds, a single valve means for controlling all of said fluid-pressure controlled means for adjusting said clutch members to drive said second counter shaft at any one of said eight speeds, and a driving connection between said second counter shaft and said spindle.

5. In a lathe of the class described, the combination of a spindle, a rotatably mounted counter shaft, fluid-pressure controlled means for selectively effecting rotation of said counter shaft at either one of two speeds, a pair of clutch members rotatably mounted on said counter shaft, a pair of gear members of different pitch diameters respectively connected to said clutch members so as to be rotatable therewith, fluid-pressure controlled means for selectively clutching said clutch members and their associated gear members to said counter shaft, each of said gear members being thereby rotatable selectively at either one of two speeds, a second counter shaft, a pair of clutch members rotatably mounted on said second counter shaft, fluid-pressure controlled means for selectively clutching said last mentioned clutch members to said second counter shaft, gear members of different pitch diameters respectively associated with each of said last mentioned clutch members, and a driving connection between each of the gear members on said first mentioned counter shaft and each of the gear members on said second counter shaft, said driving connection comprising a rotatably mounted sleeve, gear connections between said gear members on said first mentioned counter shaft and said sleeve, whereby said sleeve is selectively rotatable at any one of four speeds, gear connections between said sleeve and each of the gear members on said second counter shaft whereby each of said last mentioned gear members is rotatable selectively at any one of four speeds and whereby said second counter shaft is selectively rotatable at any one of eight speeds, a single valve means for controlling all of said fluid-pressure controlled means for adjusting said clutch members to drive said second counter shaft at any one of said eight speeds, forward and reverse driving connections between said second counter shaft and said spindle whereby the latter is selectively operable forward or reverse at any of said eight speeds and fluid-pressure controlled means for selectively engaging said forward and reverse driving connections.

Signed at Elkhart, Indiana, this 14th day of March, 1929.

WILLIAM H. FOSTER.